March 22, 1966     N. BERMAN     3,242,398
TORQUE ELEMENT FOR TRIMMER CAPACITORS
Filed Oct. 8, 1963
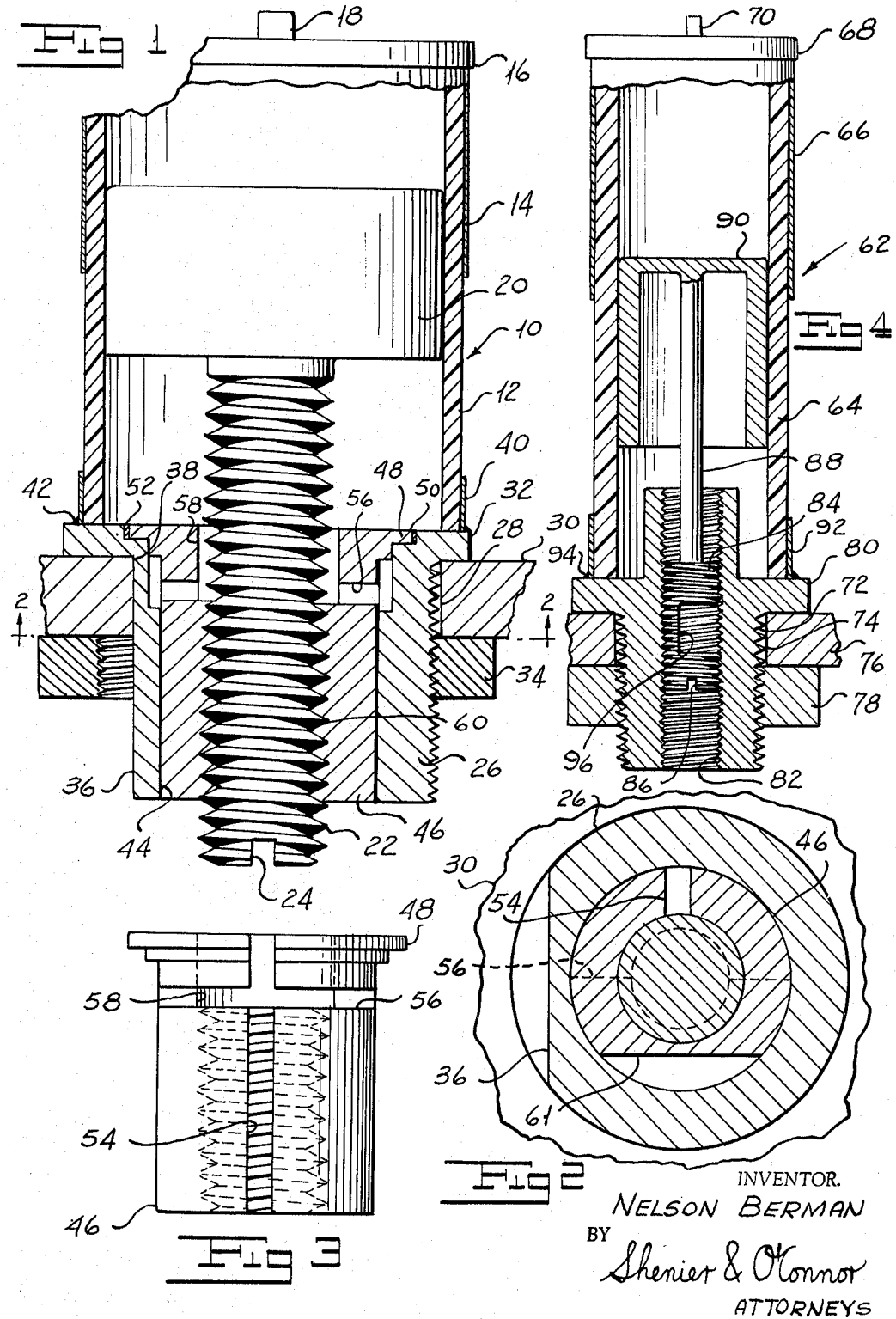
INVENTOR.
NELSON BERMAN
BY Shenier & O'Connor
ATTORNEYS United States Patent Office 3,242,398
Patented Mar. 22, 1966

3,242,398
TORQUE ELEMENT FOR TRIMMER
CAPACITORS
Nelson Berman, 6 Magnolia Drive, New Hyde Park, N.Y.
Filed Oct. 8, 1963, Ser. No. 314,766
2 Claims. (Cl. 317—249)

My invention relates to a torque element and more particularly to an improved torque element for driving a parameter varying device with a uniform, constant torque and without appreciable backlash.

There are known in the prior art many electrical devices in which two members are moved relative to each other to vary a circuit parameter. One example of such a device is a trimmer capacitor. In most of these devices of prior art, threaded elements carried by the respective members are actuated to position the members relative to each other.

In order that a device of the type described will provide a precise adjustment of the parameter being varied, it is necessary that the actuating assembly have very little backlash and that it not be liable to be accidentally moved in response to shock and vibration. While the ordinary threaded devices are suitable for most installations, they have not proven satisfactory in applications wherein highly precise relative positioning of the elements is required or where the device is subject to shock and vibrations.

I have invented a torque element for positioning a parameter varying member with a high degree of accuracy. My torque element virtually eliminates backlash. It provides a substantially uniform and constant torque at all relative positions of the parameter varying elements. It is highly resistant to accidental displacement by reason of shock and vibrations. It is simple, compact and inexpensive in construction for the result achieved thereby.

One object of my invention is to provide a torque element for positioning a parameter varying member with a high degree of accuracy.

Another object of my invention is to provide a torque element for driving a parameter varying device with substantially no lost motion.

A further object of my invention is to provide a torque element which drives a parameter varying element with a uniform torque in all positions of the element.

Yet another object of my invention is to provide a torque element which is highly resistant to accidental displacement by shock or vibration.

A still further object of my invention is to provide a simple and compact parameter varying device.

Other and further objects of my invention will appear from the following description.

In general my invention contemplates the provision of interengageable threaded elements for supporting parameter varying members for relative movement to vary an electric circuit parameter in which I form one of the elements with a cut extending in a direction transverse to the longitudinal axis of the element to ensure interengagement of the threads of that element with those of the other element over the entire length of the element.

In the accompanying drawings which form part of the instant specification and which are to be read in conjunction therewith and in which like reference numerals are used to indicate like parts in the various views:

FIGURE 1 is a sectional view of a parameter varying device incorporating one form of my torque element.

FIGURE 2 is a sectional view of the device shown in FIGURE 1 taken along the line 2—2 of FIGURE 1.

FIGURE 3 is an elevation of the form of my torque varying element incorporated in the device shown in FIGURES 1 and 2.

FIGURE 4 is a sectional view of another parameter varying device incorporating an alternate form of my torque element.

Referring now to FIGURES 1 to 3 of the drawings, I have shown a parameter varying device indicated generally by the reference character 10 which may, for example, be a trimmer capacitor comprising a cylinder 12 formed of any appropriate dielectric material such as a plastic, ceramic or glass carrying a conductive coating 14 over a portion of its length to form one of the capacitor electrodes. A cap 16 formed of metal or the like contacts the coating 14 to permit an electrical connection to be made thereto through the medium of a terminal 18 on cap 16. A piston 20 which may be a hollow insulating piston coated with conductive material or which may be made entirely of conductive material forms the other electrode of the capacitor. A screw 22 provided with a notch 24 for the reception of a tool such as a screwdriver is adapted to be driven in a manner described hereinbelow in order to vary the capacity between the electrodes 14 and 20. It will readily be understood that the capacitance is determined by the overlapping area of the two electrodes 14 and 20.

The device 10 includes a mounting bushing 26 disposed in an opening 28 in a panel 30 with a flange 32 resting on the panel. A nut 34 is adapted to be screwed on the bushing 26 to retain it in the panel. I form the bushing with a flat 36 which cooperates with a flat 38 in the opening 28 properly to position the device 10 and to restrain it against rotation as the nut 34 is threaded onto the bushing.

I provide the cylindrical support 12 with an annular area 40 of conductive material adjacent the base thereof to permit the dielectric cylinder 12 to be secured to the flange 32 by any suitable means such as by solder 42. The bushing 26 is provided with a bore 44 which receives the torque element 46 of this form of my device. In this form of my invention, the torque device is a sleeve 46. The torque sleeve 46 is generally cylindrical in shape and is provided at its upper end with a flange 48 adapted to rest on a shoulder 50 formed in the bushing 26. Solder 52 secures the sleeve 46 in position within the bushing bore 44. I form the torque element 46 with an axially extending cut 54 in the wall thereof which cut extends entirely through the wall of the torque sleeve and over the entire length of the sleeve. I provide the sleeve 46 with a second cut 56 in a direction perpendicular to the axis of the sleeve at a location disposed slightly below the top of the sleeve as viewed in FIGURE 1. The cut 56 has a depth which is equal to about half the outer diameter of the bushing 26. Sleeve 46 has a bore 58 through which the screw 22 extends. I provide the portion of the bore 58 below the cut 56, as viewed in FIGURE 1, with screw threads 60 adapted to engage the threads of screw 22. After I have made the cuts 54 and 56 in the sleeve 46, the portion of the sleeve having the internal threads is squeezed to permit it to clamp the screw resiliently to avoid backlash and to eliminate lost motion. I reduce the diameter of the sleeve 46 at a location opposite the cut 54 to form a flat 61 which facilitates the squeezing operation. Flat 61 reduces the rigidity and increases resiliency of the clamping element. Depending on material used and dimensions it may not be needed. The combination of the longitudinal cut 54 with the transverse cut 56 ensures that there is resilient clamping action on all of the threads rather than a localized clamping action even through the top of the torque sleeve 46 is soldered to the bushing 26 around its entire periphery.

Referring now to FIGURE 4 I have shown an alternate form of parameter varying device, indicated generally by the reference character 62, which also may be a trimmer capacitor. This device comprises a dielectric cylinder 64 carrying a conductive coating 66 making up one electrode of the capacitor. A cap 68 having a terminal 70 is connected to the conductive coating 66. A screw-supporting member 72 is disposed in an opening 74 in a panel 76 and is retained in the panel by a nut 78 and a flange 80 on the member 72. A threaded bore 82 in the member 72 receives a screw 84 having a notch 86 in its end for reception of a screw driver or the like. A rod 88 connects screw 84 to a piston or plunger 90 forming the other element of the capacitor. I provide the dielectric cylinder 64 with a conductive coating 92 to permit the cylinder 64 to be secured to the member 72 by solder 94.

I provide the screw 84 with a transverse cut 96 extending in a direction perpendicular to the axis of the screw for a distance slightly greater than the screw radius. This cut upsets the internal stresses produced in the course of formation of the rod from which the screw is made. Spring action is obtained by slightly deforming the screw prior to assembly. It may be accomplished by squeezing the halves together or by spreading them to cause the screw threads resiliently to engage threads 82 to ensure interengagement of threads over the entire length of the screw 84. It is to be noted that this action results in the substantial elimination of backlash and lost motion and ensures a substantially constant torque at all positions of the screw with relation to the threads 82.

In operation of the form of my invention shown in FIGURES 1 to 3, in order to vary the capacitance of the device, screw 22 is driven by means of a tool such as a screwdriver in engagement with the slot 24. As the screw is threaded into the sleeve 46, the overlapping area of the element 20 and of the film 14 increases to increase the capacitance. As the screw 22 is turned in the opposite direction, the overlapping area decreases to decrease the capacitance. At all times, owing to the cuts 54 and 56, the threads of the screw are resiliently clamped into engagement with the threads 60 of sleeve 46 over substantially the entire length of the threaded portion of the sleeve 46 to ensure a constant uniform torque in all relative positions of the screw and to eliminate any appreciable backlash and lost motion.

In operation of the form of my invention shown in FIGURE 4, actuation of screw 84 in one direction varies the capacitance of the device in one direction and rotation of the screw in the other direction varies the capacitance in the other direction. The slot 96 ensures that a constant and uniform torque is exerted in all positions and it substantially eliminates lost motion and end play.

It will be seen that I have accomplished the objects of my invention. I have provided a torque element for positioning a parameter varying member with a high degree of accuracy. My torque element substantially eliminates backlash. It provides a substantially uniform and constant torque at all relative positions of parameter varying elements. It resists accidental displacement by shock and vibration. It is simple, compact and inexpensive to construct for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In an electrical device for varying a circuit parameter by adjusting the relative positions of first and second elements a generally cylindrical member, said first element being secured to said generally cylindrical member, an internally threaded generally cylindrical sleeve, means mounting said generally cylindrical member and said threaded generally cylindrical sleeve in axially aligned relationship, said sleeve having a transverse slot intermediate its ends and having a longitudinal slot in the wall thereof extending from the end of said sleeve remote from said generally cylindrical member into said transverse slot, said slots forming two sleeve wall portions biased toward each other, said second element being mounted for movement in said generally cylindrical member, a screw in threaded engagement with said sleeve wall portions and means connecting said screw to said second element.

2. A trimmer capacitor including in combination a generally cylindrical member of dielectric material, a first capacitor electrode secured to said member, an internally threaded generally cylindrical sleeve, means mounting said member and said sleeve in axially aligned relationship, said sleeve having a transverse slot intermediate its ends and having a longitudinal slot in the wall thereof extending from the end of said sleeve remote from said member into said transverse slot, said slots forming two sleeve wall portions biased toward each other, a second capacitor electrode mounted for movement in said member, a screw in threaded engagement with said wall portions and means connecting said screw to said second electrode to permit the capacitance of said capacitor to be adjusted by turning said screw.

References Cited by the Examiner

UNITED STATES PATENTS

| 1,113,419 | 10/1914 | Dollman | 151—21 |
| 1,957,784 | 5/1934 | Johnson | 151—21 X |
| 2,035,055 | 3/1936 | Dyer | 151—14 X |
| 2,688,177 | 9/1954 | Wagner | 317—249 X |
| 2,899,220 | 8/1959 | Abrams. | |
| 3,058,042 | 10/1962 | Barnes | 317—249 |

FOREIGN PATENTS

| 768,410 | 2/1957 | Great Britain. |
| 930,357 | 7/1963 | Great Britain. |

JOHN F. BURNS, *Primary Examiner.*

LARAMIE E. ASKIN, *Examiner.*